(12) United States Patent
Kim et al.

(10) Patent No.: US 9,986,201 B2
(45) Date of Patent: May 29, 2018

(54) METHOD AND APPARATUS FOR EXCHANGING PROTOCOL

(71) Applicant: NEXTCHIP CO., LTD., Seongnam-si (KR)

(72) Inventors: Do Kyun Kim, Seoul (KR); Jin Gun Song, Seoul (KR)

(73) Assignee: NEXTCHIP CO., LTD., Seongnam-si, Gyeonggi-do (KR)

( * ) Notice: Subject to any disclaimer, the term of this patent is extended or adjusted under 35 U.S.C. 154(b) by 0 days. days.

(21) Appl. No.: 15/031,918

(22) PCT Filed: Feb. 27, 2015

(86) PCT No.: PCT/KR2015/001914
§ 371 (c)(1),
(2) Date: Apr. 25, 2016

(87) PCT Pub. No.: WO2016/098947
PCT Pub. Date: Jun. 23, 2016

(65) Prior Publication Data
US 2016/0344974 A1 Nov. 24, 2016

(30) Foreign Application Priority Data

Dec. 18, 2014 (KR) ........................ 10-2014-0183146

(51) Int. Cl.
*H04N 7/025* (2006.01)
*H04N 7/088* (2006.01)
(Continued)

(52) U.S. Cl.
CPC ............. *H04N 7/025* (2013.01); *H04N 5/205* (2013.01); *H04N 5/232* (2013.01); *H04N 7/088* (2013.01); *H04N 7/102* (2013.01); *H04N 7/18* (2013.01)

(58) Field of Classification Search
CPC ......... H04N 7/088; H04N 7/087; H04N 7/025
See application file for complete search history.

(56) References Cited

U.S. PATENT DOCUMENTS

| | | | | |
|---|---|---|---|---|
| 5,426,466 A | * | 6/1995 | Bocox ...................... | H04N 7/04 348/482 |
| 2003/0095190 A1 | * | 5/2003 | Mizutani ................ | H04N 7/181 348/211.1 |
| 2014/0241703 A1 | * | 8/2014 | Hwang ..................... | H04N 5/76 386/327 |

FOREIGN PATENT DOCUMENTS

| | | |
|---|---|---|
| CN | 1599457 A | 3/2005 |
| CN | 102170556 A | 8/2011 |

(Continued)

OTHER PUBLICATIONS

China Office Action 201510191148.2 dated Jan. 12, 2016, 6 pages.

(Continued)

*Primary Examiner* — Obafemi Sosanya
(74) *Attorney, Agent, or Firm* — Daly, Crowley, Mofford & Durkee, LLP

(57) ABSTRACT

A method and apparatus for exchanging a protocol is provided. A protocol may be indicated in a preset section of a vertical blanking interval (VBI) of an analog video and thereby transmitted. A protocol transmission apparatus may transmit an analog video signal in which a protocol signal is indicated to a protocol reception apparatus. The protocol reception apparatus may detect a protocol by receiving the analog video signal from the protocol transmission apparatus.

18 Claims, 12 Drawing Sheets

(51) Int. Cl.
  *H04N 7/18*   (2006.01)
  *H04N 5/205*  (2006.01)
  *H04N 5/232*  (2006.01)
  *H04N 7/10*   (2006.01)
  *H04N 5/76*   (2006.01)
  *H04N 7/04*   (2006.01)

(56) References Cited

FOREIGN PATENT DOCUMENTS

| | | |
|---|---|---|
| CN | 103873620 A | 6/2014 |
| CN | 103891273 A | 6/2014 |
| EP | 0 420 289 A2 | 9/1990 |
| EP | 1 463 326 A1 | 9/2004 |
| JP | 2008104146 A | 5/2008 |
| JP | 2009201127 A | 9/2009 |
| KR | 20000006599 A | 2/2000 |
| KR | 20110030872 A | 3/2011 |

OTHER PUBLICATIONS

Korean Office Action dated Dec. 18, 2014, Appiication No. 9-5-2015-025562787, 4 pages.
PCT International Search Report, PCT/KR2015/001914, dated Jul. 7, 2015, 3 pages.
PCT Written Opinion, PCT/KR2015/001914, dated Jul. 7, 2015, 5 pages.

* cited by examiner

FIG. 6

| LINE ORDER | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|
| SECTION | | | VIDEO TRANSMISSION APPARATUS | | | | | | | VIDEO RECEPTION APPARATUS | | | | | | | | EQUALIZING | | | | | |
| DESCRIPT | | | ISP INFO | | | | RESERVE | | | OSD CONTROL | | I2C CONTROL | | | | | | EQUALIZING PATTERN SIGNAL | | | | | |

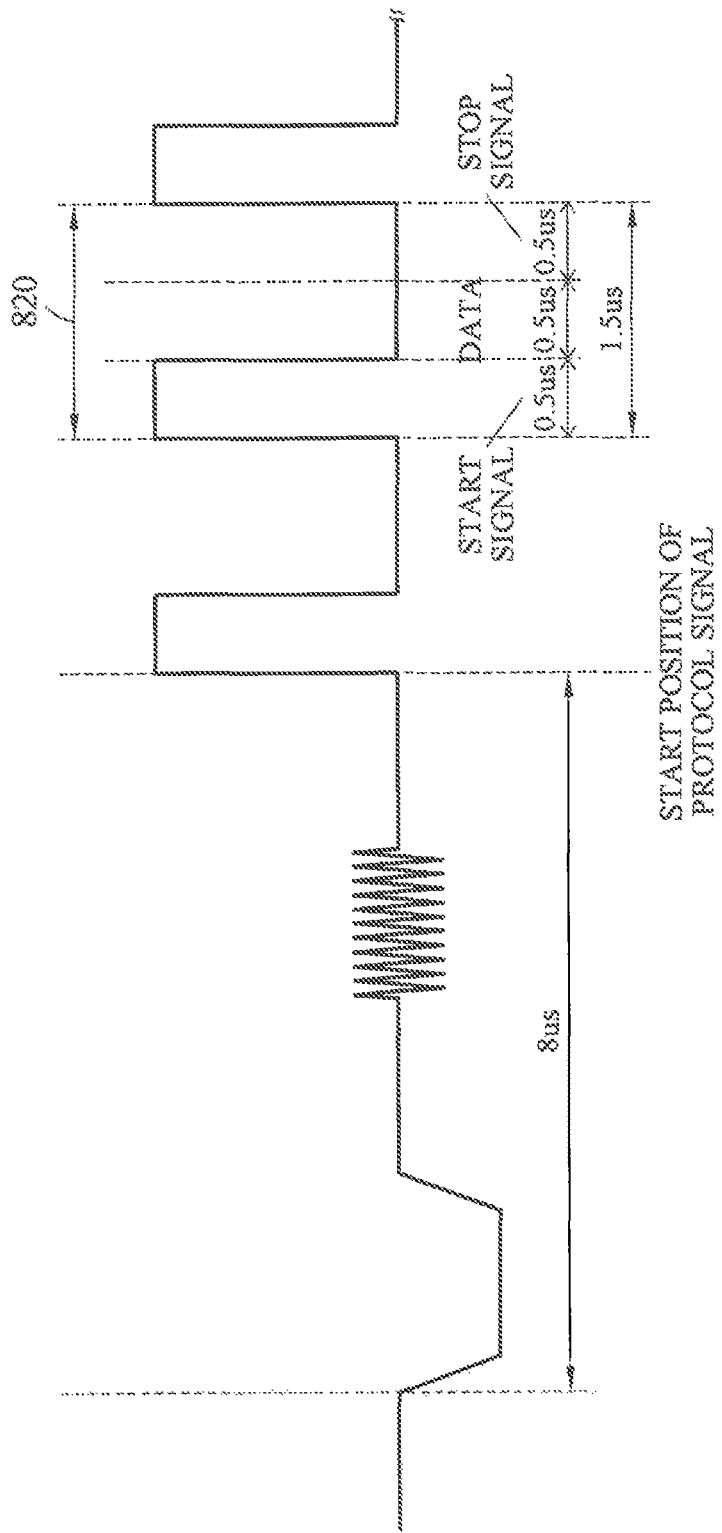

EQUALIZING PATTERN SIGNAL OF
LUMINANCE SIGNAL

EQUALIZING PATTERN SIGNAL OF
COLOR DIFFERENCE SIGNAL

METHOD AND APPARATUS FOR EXCHANGING PROTOCOL

CROSS REFERENCE TO RELATED APPLICATION

This application is a U.S. National Stage of PCT application PCT/KR2015/001914 filed in the Korean language on Feb. 27, 2015, and entitled "METHOD AND APPARATUS FOR EXCHANGING PROTOCOL" which claims priority to Korean application KR 10-2014-0183146, filed Dec. 18, 2014 which applications are each hereby incorporated herein by reference in their entireties.

TECHNICAL FIELD

Example embodiments relate to a method and apparatus for exchanging a protocol, and more particularly, to a method and apparatus for exchanging a protocol by indicating a protocol in a vertical blanking interval (VBI) of an analog video signal.

RELATED ART

To control a photographing video, an instruction is transferred from a video transmission/reception system to a camera. A method of using a separate control cable and a method of using a video transmission cable may be employed to transfer the instruction. In the case of using the separate control cable, some issues may arise in terms of system security.

The method of using the video transmission cable may be a method of using a single cable. The method of using a single cable may not correct an error in receiving an instruction. That is, the method may not correct a reception error in response to an occurrence of a communication error.

Korean Patent Laid-Opera Publication No. 10-2011-0030872, published on Mar. 24, 2011, discloses a monitoring camera control system. The above invention relates to a monitoring camera control system that includes a transmitter configured to transmit a pan/tilt control signal of a monitoring cameral and to output a video transmitted from a monitoring camera, a receiver configured to receive a control signal input to an address of the receiver from the transmitter and to control the monitoring camera, and the monitoring camera. The receiver includes an address input engine for inputting an address using decimal data, a protocol setter for storing product protocol information to support a multi-protocol, and a display for displaying an operation state of each portion of the receiver.

DETAILED DESCRIPTION

Technical Subject

Example embodiments provide a protocol transmission apparatus and method.

Example embodiments also provide a protocol reception apparatus and method.

Solution

According to an aspect, there is provided a protocol transmission method performed by a protocol transmission apparatus within a closed-circuit system, the protocol transmission method including indicating a protocol signal on a first area preset within a vertical blanking interval (VBI) of an analog video signal, and transmitting the analog video signal to a protocol reception apparatus of the closed-circuit system.

The transmitting may include transmitting the analog video signal to the protocol reception apparatus through a coaxial cable.

The first area may differ from an area preset with respect to the protocol reception apparatus.

The protocol signal may indicate at least one of a format of the analog video signal, an intensity of illumination of a video indicated by the analog video signal, information about a sensor used to photograph the video, and motion information of the sensor.

The protocol signal may be a signal for controlling an operation of a video photographing device of the protocol reception apparatus.

The indicating may include indicating the same protocol signals on the first area.

The protocol transmission method may further include indicating an equalizing pattern signal on a second area preset within the VBI.

The equalizing pattern signal may be used for equalizing of the analog video signal.

The equalizing pattern signal may be a composite signal that includes an equalizing pattern signal of a color difference signal and an equalizing pattern signal of a luminance signal.

The equalizing pattern signal of the luminance signal and the equalizing pattern signal of the color difference signal may be negotiated in advance with the protocol reception apparatus.

According to another aspect, there is provided a protocol transmission apparatus within a closed-circuit system, the protocol transmission apparatus including a processor configured to indicate a protocol signal on a first area preset within a VBI of an analog video signal, and a communicator configured to transmit the analog video signal to a protocol reception apparatus of the closed-circuit system.

According to still another aspect, there is provided a protocol reception method performed by a protocol reception apparatus within a closed-circuit system, the protocol reception method including receiving an analog video signal from a protocol transmission apparatus of the closed-circuit system, and detecting a protocol signal on a first area preset within a VBI of the analog video signal.

The receiving may include receiving the analog video signal from the protocol transmission apparatus through a coaxial cable.

The first area may differ from an area preset with respect to the protocol reception apparatus.

The protocol signal may indicate at least one of a format of the analog video signal, an intensity of illumination of a video indicated by the analog video signal, information about a sensor used to photograph the video, and motion information of the sensor.

The protocol signal may be a signal for controlling an operation of a video photographing device of the protocol reception apparatus.

The detecting may include detecting the same protocol signals indicated on the first area.

The protocol reception method may further include compensating for the analog video signal based on an equalizing pattern signal indicated on a second area preset within the VBI.

The detecting may be performed based on the compensated analog video signal.

The equalizing pattern signal may be a composite signal that includes an equalizing pattern signal of a color difference signal and an equalizing pattern signal of a luminance signal.

The compensating may include detecting the equalizing pattern signal, determining a distortion level of the analog video signal based on the equalizing pattern signal, and compensating for the analog video signal by applying a filter corresponding to the distortion level to the analog video signal.

The determining of the distortion level may include separating the equalizing pattern signal into an equalizing pattern signal of a color difference signal and an equalizing pattern signal of a luminance signal, and determining the distortion level based on at least one of the equalizing pattern signal of the luminance signal and the equalizing pattern signal of the color difference signal.

The determining of the distortion level may include comparing a reference equalizing pattern signal to at least one of an equalizing pattern signal of a color difference signal and an equalizing pattern signal of a luminance signal, and determining the distortion level based on a result of the comparing.

The determining of the distortion level based on at least one of the equalizing pattern signal of the luminance signal and the equalizing pattern signal of the color difference signal may include determining at least one of a distortion level of a direct current (DC) area and a distortion level of an alternating current (AC) area based on the equalizing pattern signal of the luminance signal.

According to still another aspect, there is provided a protocol reception apparatus within a closed-circuit system, the protocol reception apparatus including a communicator configured to receive an analog video signal from a protocol transmission apparatus of the closed-circuit system, and a processor configured to detect a protocol signal indicated on a first area preset within a VBI of the analog video signal.

Effect

According to example embodiments, there may be provided a protocol transmission apparatus and method.

Also, according to example embodiments, there may be provided a protocol reception apparatus and method.

BRIEF DESCRIPTION OF DRAWINGS

FIG. 6 illustrates an example of a section preset in a line of an analog video signal according to example embodiments;

FIG. 8 illustrates an example of a protocol signal indicated in an analog video signal according to example embodiments;

MODE

Figure 1:
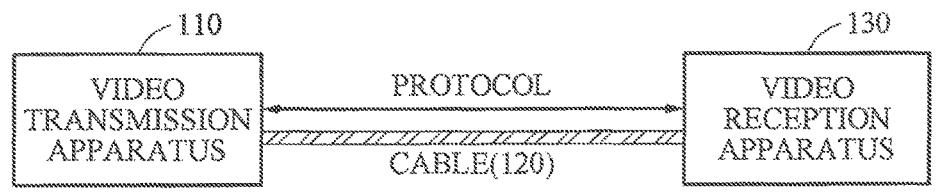
FIG. 1 illustrates an example of a closed-circuit system according to example embodiments.

Hereinafter, some example embodiments will be described in detail with reference to the accompanying drawings. Like reference numerals in the drawings refer to like elements throughout the present specification.

Various modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting. As used herein, the singular limits "a," "an" and "the" are intended to include the plural forms as well, unless the context clearly indicates otherwise. It will be further understood that the terms "comprise/include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

FIG. 1 illustrates an example of a closed-circuit system according to example embodiments.

Referring to FIG. 1, the closed-circuit system may include a video transmission apparatus 110 and a video reception apparatus 130.

The video transmission apparatus 110 may generate a digital video using a camera. The video transmission apparatus 110 may convert the digital video to an analog video. The video transmission apparatus 110 may transmit the analog video signal to the video reception apparatus 130. For example, the video transmission apparatus 110 may transmit the analog video signal to the video reception apparatus 130 through a cable 120. The cable 120 may be a coaxial cable.

The video transmission apparatus 110 may convert a digital video signal captured at a variety of resolutions to an analog video signal. For example, a resolution of the digital video may be a standard definition (SD), a high definition (HD), a full HD (FHD), or an ultra HD (UHD).

The closed-circuit system may transmit an analog video signal corresponding to a variety of resolutions using the cable 120 to transmit an analog video signal corresponding to an existing SD.

A protocol may be exchanged between the video transmission apparatus 110 and the video reception apparatus 130. For example, the video transmission apparatus 110 may transmit a protocol to the video reception apparatus 130 by indicating a protocol signal in an analog video signal. As another example, the video reception apparatus 130 may transmit a protocol to the video transmission apparatus 110 by indicating a protocol signal in a received analog video signal.

Regardless of names of the video transmission apparatus 110 and the video reception apparatus 130, an apparatus for transmitting a protocol signal may be a protocol transmission apparatus. Regardless of names of the video transmission apparatus 110 and the video reception apparatus 130, an apparatus for receiving a protocol signal may be a protocol reception apparatus. That is, the closed-circuit system may include the protocol transmission apparatus and the protocol reception apparatus.

The protocol transmission apparatus and the protocol reception apparatus will be described with reference to FIG. 2 through FIG. 15.

Figure 2:
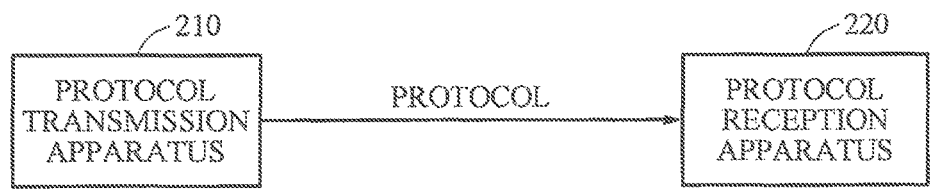
FIG. 2 illustrates an example of a protocol exchange system according to example embodiments.

FIG. 2 illustrates an example of a protocol exchange system according to example embodiments.

Referring to FIG. 2, the protocol exchange system may include a protocol transmission apparatus 210 and a protocol reception apparatus 220.

The protocol exchange system may be identical to a closed-circuit system.

The protocol transmission apparatus 210 may transmit a protocol to the protocol reception apparatus 220 by indicating a protocol signal in an analog video signal.

According to an aspect, in an example in which the video transmission apparatus 110 transmits a protocol, the video transmission apparatus 110 may correspond to the protocol transmission apparatus 210 and the video reception apparatus 130 may correspond to the protocol reception apparatus 220.

According to another aspect, in an example in which the video reception apparatus 130 transmits a protocol, the video reception apparatus 130 may correspond to the protocol transmission apparatus 210 and the video transmission apparatus 110 may correspond to the protocol reception apparatus 220.

Figure 3:
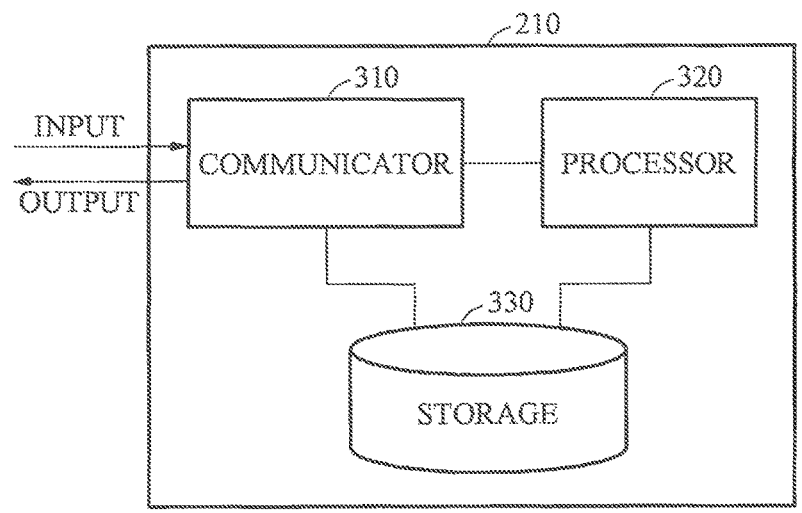
FIG. 3 is a block diagram illustrating an example of a protocol transmission apparatus according to example embodiments.

FIG. 3 is a block diagram illustrating an example of a protocol transmission apparatus according to example embodiments.

Referring to FIG. 3, the protocol transmission apparatus 210 may include a communicator 310, a processor 320, and a storage 330.

The communicator 310 may be connected to another apparatus to transmit and receive data. For example, the communicator 310 may transmit an analog video signal to the protocol reception apparatus 220.

The processor 320 may process data received at the communicator 310, or may process data stored in the storage 330.

The storage 330 may store data received at the communicator 310, or may store data processed at the processor 320.

The communicator 310, the processor 320, and the storage 330 will be described with reference to FIGS. 4 through 10.

Figure 4:
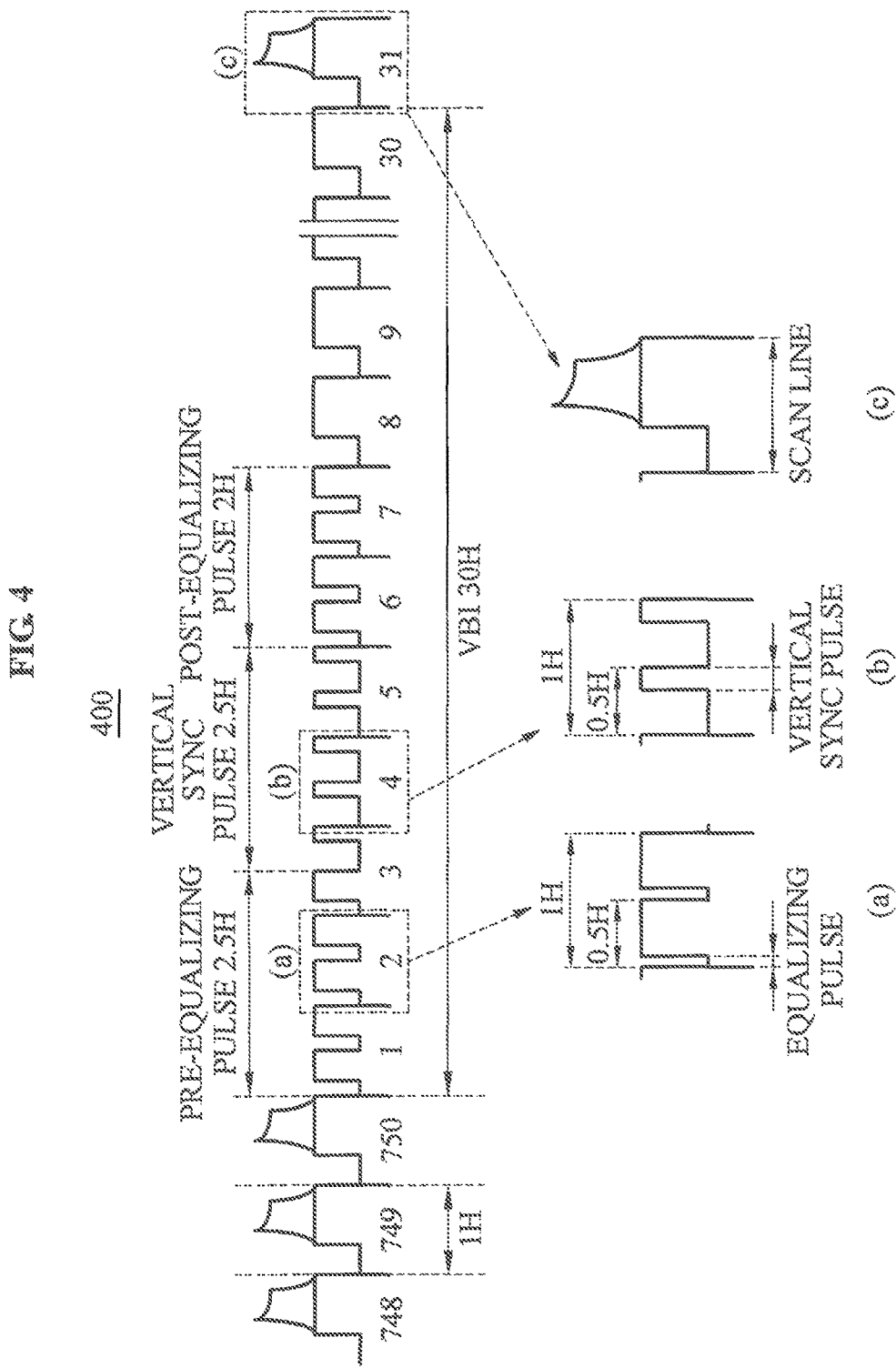
FIG. 4 illustrates an example of a timing of an analog video signal according to example embodiments.

FIG. 4 illustrates an example of a timing of an analog video signal according to example embodiments.

The analog video signal of FIG. 4 may be, for example, an analog video signal about a digital video having a resolution of 1280×720. Among 750 lines, 30 lines may be included in a vertical blanking interval (VBI) and 720 lines may be active lines or scan lines. 1 H may indicate an interval assigned to a single line.

The VBI may include a pre-equalizing pulse, a vertical sync pulse, and a post-equalizing pulse. The VBI may include a blank line. The blank line may be a section in which specific information is not assigned. In the analog video signal of FIG. 4, 8-th and 30-th lines may be blank lines.

Figure 5:
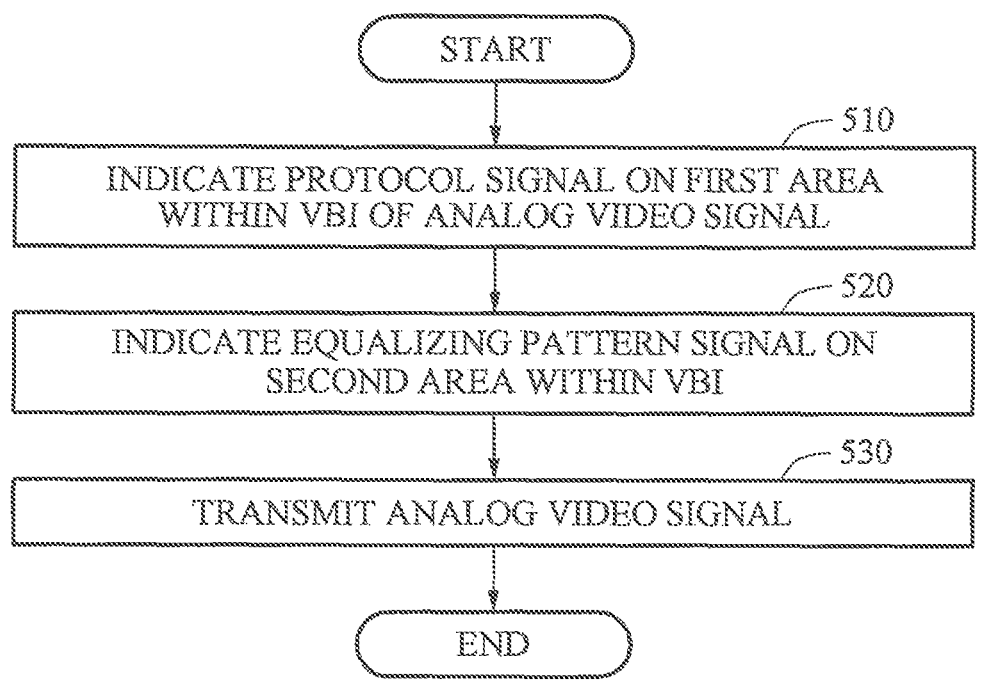
FIG. 5 is a flowchart illustrating an example of a protocol transmission method according to example embodiments.

FIG. 5 is a flowchart illustrating an example of a protocol transmission method according to example embodiments.

Referring to FIG. 5, in operation 510, the processor 320 may indicate a protocol signal on a first area preset within a VBI of an analog video signal. The first area may be set to be different based on a type of the protocol transmission apparatus 210. The first area preset for the protocol transmission apparatus 210 may differ from an area preset for the protocol reception apparatus 220.

The processor 320 may indicate the same protocol signals on the first area.

According to an aspect, when the protocol transmission apparatus 210 corresponds to the video transmission apparatus 110, the first area preset within the VBI may be 9-th and 16-th lines of the analog video signal of FIG. 4.

According to another aspect, when the protocol transmission apparatus 210 corresponds to the video reception apparatus 130, the first area preset within the VBI may include 17th to 21st lines of the analog video signal of the of FIG. 4.

An area of the analog video signal on which a protocol signal is indicated will be described with reference to FIG. 6.

A protocol to be indicated may differ for each transmission apparatus.

According to an aspect, when the protocol transmission apparatus 210 corresponds to the video transmission apparatus 110, a protocol may be indicated as expressed by Table 1. A protocol signal of Table 1 may include a format of the analog video signal, an intensity of illumination of a video indicated by the analog video signal, information about a sensor used to photograph the video, and motion information of the sensor.

The protocol to be indicated may be at least one of the format of the analog video signal, the intensity of illumination of the video indicated by the analog video signal, information about the sensor used to photograph the video, and motion information of the sensor.

For example, an intensity of illumination of sensing equipment may repeat becoming bright and then dark over time. A function of the sensing equipment for identifying day and night may be a day/night function. When the protocol transmission apparatus 210 corresponds to the video transmission apparatus 110, the protocol transmission apparatus 210 may transmit an analog video signal corresponding to the above feature.

The protocol transmission apparatus 210 may transmit an analog video signal based on a luminance signal excluding a color difference signal that is a feature of a night video. The protocol transmission apparatus 210 may transmit the above feature to the protocol reception apparatus 220 through a first area of the analog video signal.

TABLE 1

| Line number | ISP information | I2C mode |
| --- | --- | --- |
| 9-th | ISP data 1 | Header |
| 10-th | ISP data 2 | Slave address |
| 11-th | ISP data 3 | Address |
| 12-th | ISP data 4 | Data |
| 13-th | ISP expanded data | Expansion |
| 14-th | | |
| 15-th | | |
| 16-th | | |

A protocol may be a protocol of one of two modes: an image signal processor (ISP) information transmission mode and an inter-integrated circuit (I2C) mode.

According to an aspect, the ISP information transmission mode is a mode for transmitting ISP information of the video transmission apparatus 110. When ISP information is transmitted as a protocol and a video is restored at the video reception apparatus 130, a restoration rate of an original video may be enhanced.

For example, ISP data 1 may be auto gain control (AGC). The AGC may be information used to adjust a strength of a signal according to a screen brightness.

For example, ISP data 2 may be sharpness. The sharpness may be information used to adjust a strength of a high frequency portion.

For example, ISP data 3 may video out information. The video out information may indicate a vertical resolution and a horizontal resolution of a video.

For example, ISP data 4 may be brightness information. The brightness information may be a luminance level of a video.

According to another aspect, the I2C mode may be a mode for controlling an external apparatus using a protocol through I2C.

For example, a protocol transmitted from the protocol transmission apparatus 210 may be a response of an external apparatus connected to the protocol transmission apparatus 210 to a protocol received at the protocol transmission apparatus 210. The protocol transmission apparatus 210 may transmit the response to the received protocol by transmitting the same protocol as the received protocol.

For example, a header may be an identification code of the I2C mode.

For example, a slave address may be an identifier of the external apparatus connected to the protocol transmission apparatus 210.

For example, an address may be a lower address of a specific bank.

For example, data may be a data value of a corresponding address.

According to another aspect, when the protocol transmission apparatus 210 corresponds to the video reception apparatus 130, a protocol may be indicated as expressed by Table 2. A protocol signal of Table 2 may be a pant tilt zoom (PTZ) control signal for controlling a camera of the video transmission apparatus 110. The protocol signal may be a signal for controlling an operation of a video photographing device of the video transmission apparatus 110.

TABLE 2

| Line number | PTZ control mode | I2C mode | Other modes |
| --- | --- | --- | --- |
| 17-th | Pelco C 18-th | Header | Programmable 1 |
| 18-th | | Slave address | Programmable 2 |
| 19-th | Pelco C 19-th | Address | Programmable 3 |
| 20-th | | Data | Programmable 4 |
| 21-st | | Baud | Programmable 5 |

A protocol may be a protocol of one of a plurality of modes: a PTZ control mode, an I2C mode, and other modes.

According to an aspect, the PTZ control mode may follow a Pelco C regulation. For example, a value of an 18-th line of Pelco C may be indicated in 17-th and 18-th lines. The same value may be indicated in the 17-th and 18-th lines.

For example, a value of a 19-th line of Pelco C may be indicated in 19-th and 20-th lines. The same value may be indicated in the 19-th and 20-th lines.

For example, the processor 320 may indicate 8 bit in a single line. A bit to be indicated will be described with reference to FIG. 8.

According to another aspect, the I2C mode may be a mode for controlling an external apparatus using a protocol. The external apparatus may refer to an external apparatus connected to the video transmission apparatus 110.

For example, a header may be an identification code of the I2C mode.

For example, a slave address may be an identifier of the external apparatus. A least significant bit may indicate a read mode or a write mode.

For example, an address may indicate a position of a register in which data is present.

For example, in a write mode, data may be a value of data and may be a value that is applied to the video transmission apparatus 110.

For example, a baud may be determined when an I2C master of the video transmission apparatus 110 operates. The baud may be used to control a speed of corresponding I2C.

In operation 520, the processor 320 may indicate an equalizing pattern signal on a second area preset within the VBI. The equalizing pattern signal may be used for equalizing of the analog video signal at the protocol reception apparatus 220 having received the analog video signal.

For example, the second area may include 25-th to 28-th lines of the VBI. The second area may be same with respect to the video transmission apparatus 110 and the video reception apparatus 130.

The equalizing pattern signal will be described with reference to FIGS. 9A, 9B, and 10.

In operation 530, the communicator 310 may transmit the analog video signal to the protocol reception apparatus 220.

For example, the communicator 310 may transmit the analog video signal to the protocol reception apparatus 220 through a coaxial cable.

FIG. 6 illustrates an example of a section preset in a line of an analog video signal according to example embodiments.

A table of FIG. 6 shows the section preset with respect to the analog video signal for a protocol signal.

9th to 16-th lines of the analog video signal may be preset with respect to the video transmission apparatus 110. A protocol preset with respect to the video transmission apparatus 110 may relate to ISP information.

17th to 21-th lines of the analog video signal may be preset with respect to the video reception apparatus 130. Here, a protocol preset with respect to the video reception apparatus 130 may relate to On Screen Display (OSD) control and I2C control.

25-th to 28-th lines of the analog video signal may be preset with respect to an equalizing pattern signal.

Figure 7:
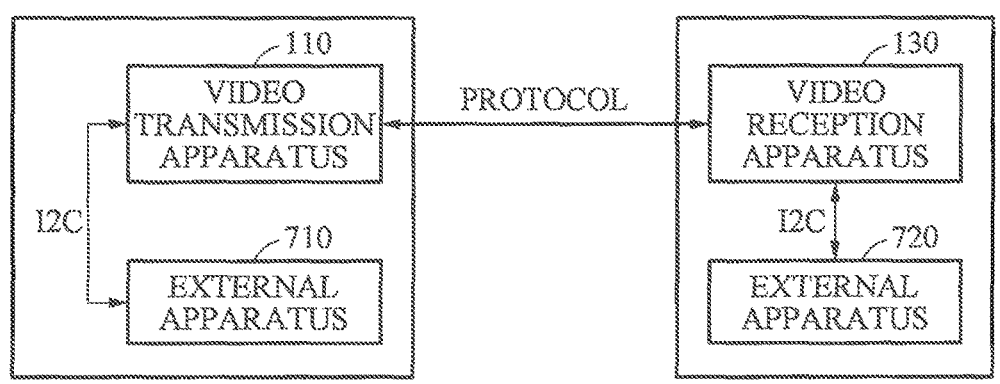
FIG. 7 illustrates an example of an external apparatus control through an I2C interface according to example embodiments.

FIG. 7 illustrates an example of an external apparatus control through an I2C interface according to example embodiments.

Referring to FIG. 7, the video transmission apparatus 110 may be connected to an external apparatus 710 through an I2C interface.

The video reception apparatus 130 may be connected to an external apparatus 720 through an I2C interface.

For example, the video reception apparatus 130 may control the external apparatus 710 by transmitting a protocol to the video transmission apparatus 110. As another example, the video transmission apparatus 110 may control the external apparatus 720 by transmitting a protocol to the video reception apparatus 130.

FIG. 8 illustrates an example of a protocol signal indicated in an analog video signal according to example embodiments.

A protocol signal is indicated in a single protocol line 810 of the analog video signal.

A single bit 820 of the protocol signal may include a start signal, data, and a stop signal. For example, a width of each of the start signal, data, and the stop signal may be 0.5 μs.

The start signal may be a high signal. The stop signal may be a low signal. The data may be a high signal or a low signal.

A start position of the protocol signal may be positioned at a position after 8 μs from a horizontal sync signal.

Figure 9A:
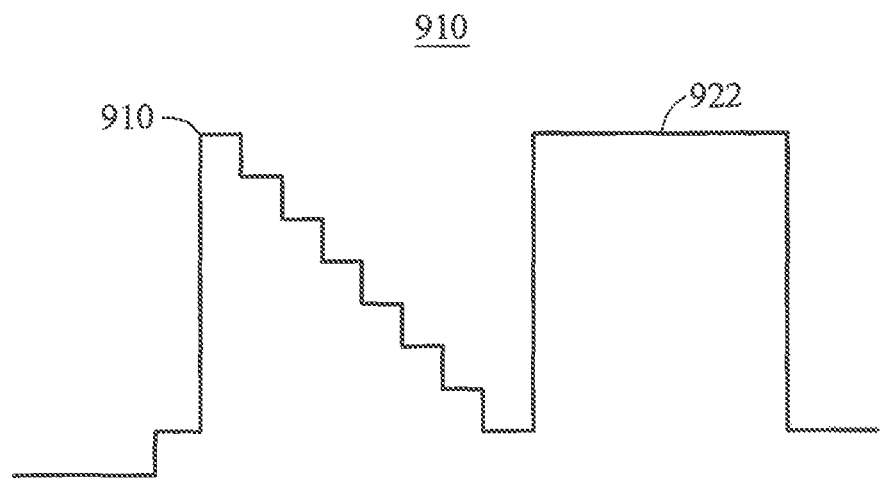
FIG. 9A illustrates an example of an equalizing pattern signal of a luminance signal according to example embodiments.

FIG. 9A illustrates an example of an equalizing pattern signal of a luminance signal according to example embodiments.

Figure 9B:
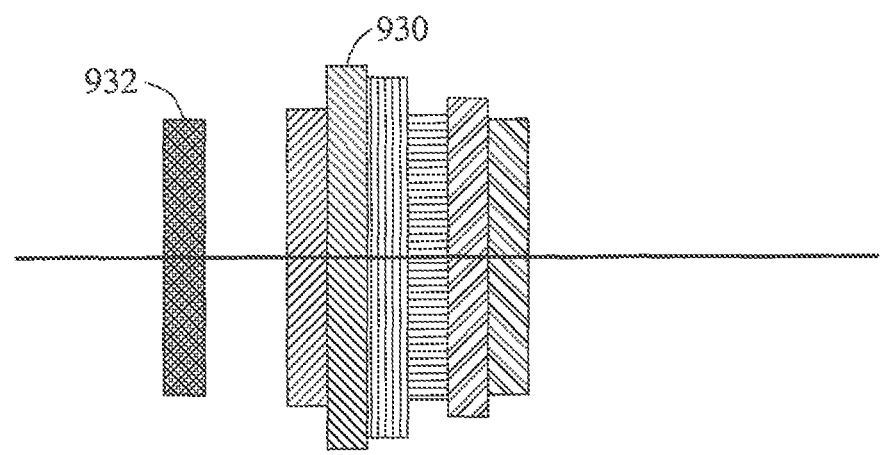
FIG. 9B illustrates an example of an equalizing pattern signal of a color difference signal according to example embodiments.

FIG. 9B illustrates an example of an equalizing pattern signal of a color difference signal according to example embodiments.

An equalizing pattern signal 910 of a luminance signal and an equalizing pattern signal 930 of a color difference signal may be used for equalizing of an analog video signal.

The equalizing pattern signal 910 of the luminance signal may include a first signal 920 and a second signal 922.

The equalizing pattern signal of the luminance signal and the equalizing pattern signal of the color difference signal may be negotiated in advance with the protocol reception apparatus. For example, an amplitude of the equalizing pattern signal 910 of the luminance signal may be negotiated in advance between the protocol transmission apparatus 210 and the protocol reception apparatus 220.

Each bar of the equalizing pattern signal 930 of the color difference signal may represent an amplitude set for color.

A burst scale signal 932 may represent an amplitude of a burst signal.

Figure 10:
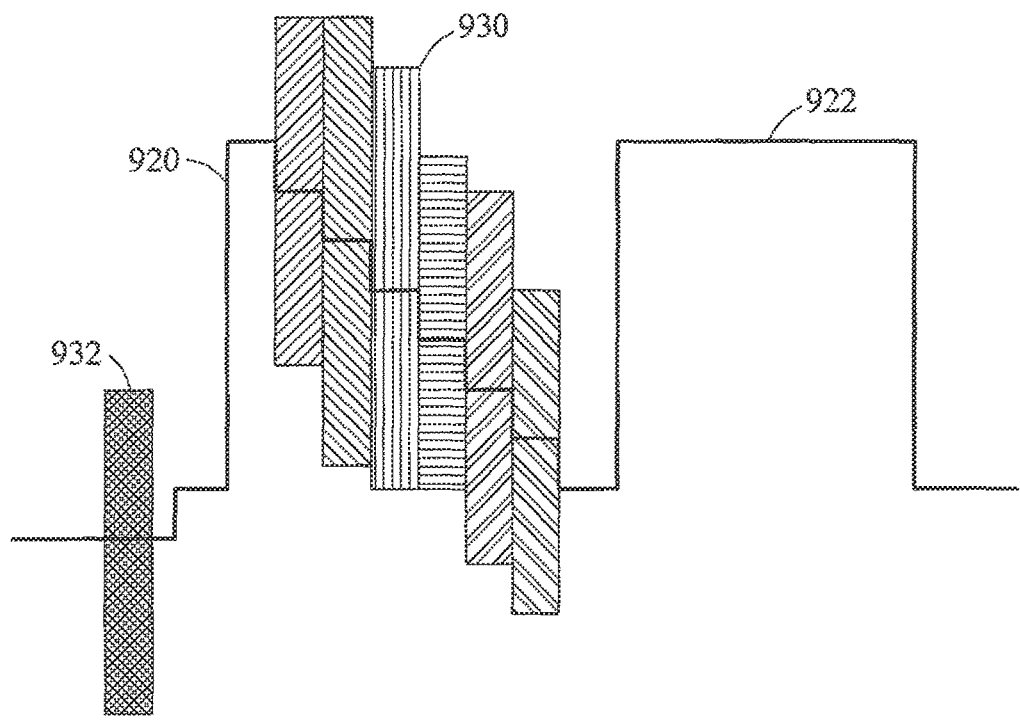
FIG. 10 illustrates an example of a composite equalizing pattern signal according to example embodiments.

FIG. 10 illustrates an example of a composite equalizing pattern signal according to example embodiments.

An equalizing pattern signal indicated in an analog video signal may be a composite equalizing pattern signal 1010.

For example, the equalizing pattern signal 1010 may be a signal in which the equalizing pattern signal of the luminance signal including the first signal 920 and the second signal 922, and the equalizing pattern signal 930 of the color difference signal. The equalizing pattern signal 1010 may be a composite signal.

Figure 11:
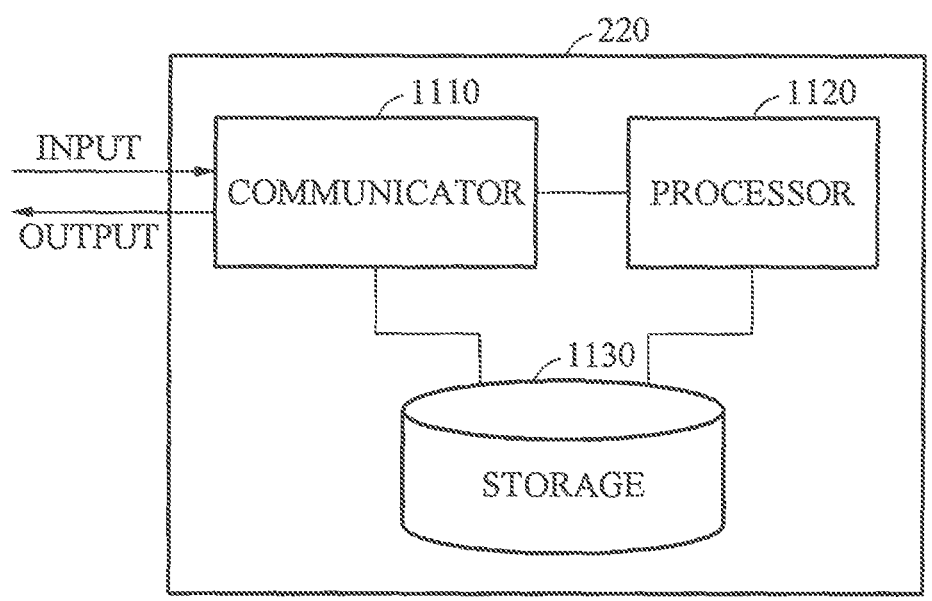
FIG. 11 is a block diagram illustrating an example of a protocol reception apparatus according to example embodiments.

FIG. 11 is a block diagram illustrating an example of a protocol reception apparatus according to example embodiments.

Referring to FIG. 11, the protocol reception apparatus 220 may include a communicator 1110, a processor 1120, and a storage 1130.

The communicator 1110 may be connected to another apparatus to transmit and receive data. For example, the communicator 1110 may receive an analog video signal from the protocol transmission apparatus 210.

The processor 1120 may process data received at the communicator 1110, or may process data stored in the storage 1130.

The storage 1130 may store data received at the communicator 1110, or may store data processed at the processor 1120.

The communicator 1110, the processor 1120, and the storage 1130 will be described with reference to FIGS. 12 through 15.

According to an aspect, the communicator 1110 may perform all of the functions performed at the communicator 310 of FIG. 3. That is, the description relating to the communicator 310 may be applicable to the communicator 1130. Also, the following description relating to the communicator 1110 may be understood as the description relating to the communicator 310.

The processor 1120 may perform all of the functions performed at the processor 320 of FIG. 3. That is, the description relating to the processor 320 may be applicable to the processor 1120. Also, the following description relating to the processor 1120 may be understood as the description relating to the processor 320.

The storage 1130 may perform all of the functions performed at the storage 330 of FIG. 3. That is, the description relating to the storage 330 may be applicable to the storage 1130. Also, the following description relating to the storage 11300 may be understood as the description relating to the storage 330.

Figure 12:
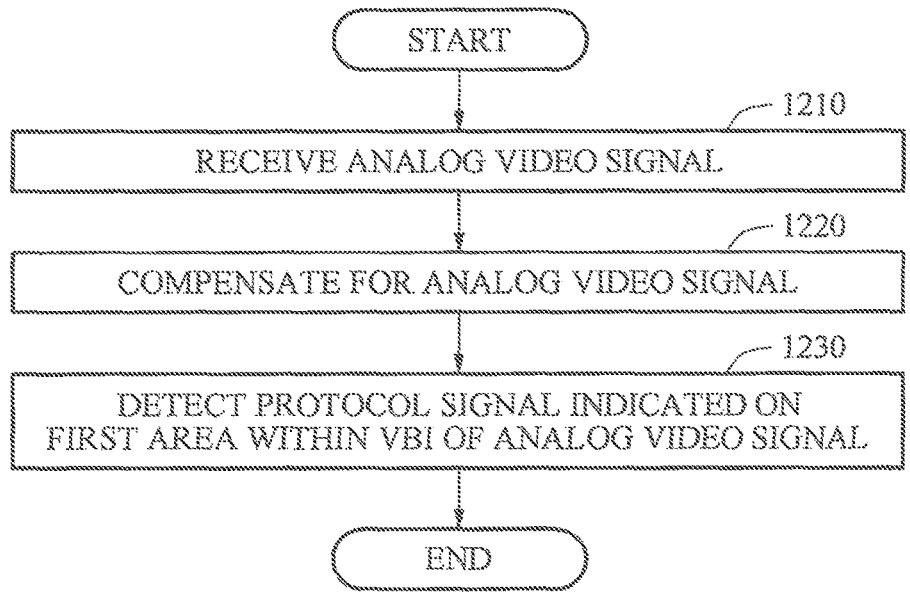
FIG. 12 is a flowchart illustrating an example of a protocol reception method according to example embodiments.

FIG. 12 is a flowchart illustrating an example of a protocol reception method according to example embodiments.

In operation 1210, the communicator 1110 may receive an analog video signal from the protocol transmission apparatus 210.

According to an aspect, the communicator 1110 may receive the analog video signal through a coaxial cable.

In operation 1220, the processor 1120 may compensate for the analog video signal.

According to an aspect, the processor 1120 may compensate for the analog video signal based on an equalizing pattern signal indicated on a second area preset within a VBI of the analog video signal.

A method of compensating for the analog video signal will be described with reference to FIGS. 13 through 15.

In operation 1230, the processor 1120 may detect a protocol signal indicated on a first area preset within the VBI of the analog video signal.

According to an aspect, the processor 1120 may detect the same protocol signals indicated on the first area. A plurality of protocols may be detected only when all of the protocols are determined to be same.

Figure 13:
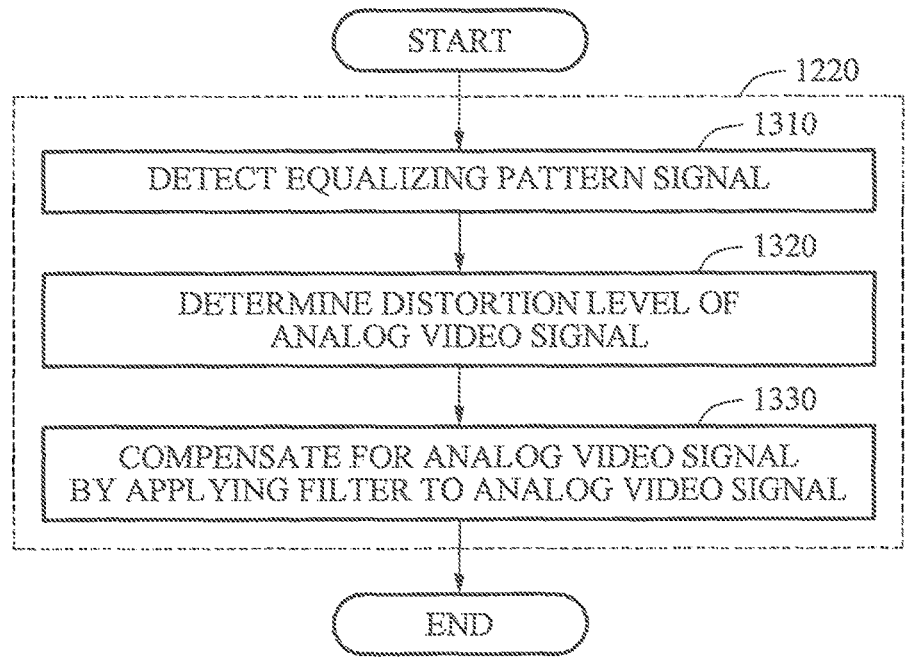
FIG. 13 is a flowchart illustrating an example of a method of compensating for an analog video signal according to example embodiments.

FIG. 13 is a flowchart illustrating an example of a method of compensating for an analog video signal according to example embodiments.

Operation 1220 of FIG. 12 may include operations 1310 through 1330.

In operation 1310, the processor 1120 may detect an equalizing pattern signal of the analog video signal.

In operation 1320, the processor 1120 may determine a distortion level of the analog video signal based on the equalizing pattern signal. The distortion level may be a compensation index or compensation gain.

A method of determining the distortion level will be described with reference to FIG. 14.

In operation 1330, the processor 1120 may determine a filter corresponding to the distortion level. For example, the processor 1120 may determine a filter that is mapped to the distortion level among a plurality of filters.

The processor 1120 may compensate for the analog video signal by applying the filter to the analog video signal.

In operation 1230 of FIG. 12, the processor 1120 may detect the protocol signal indicated on the first area based on the compensated analog video signal.

Figure 14:
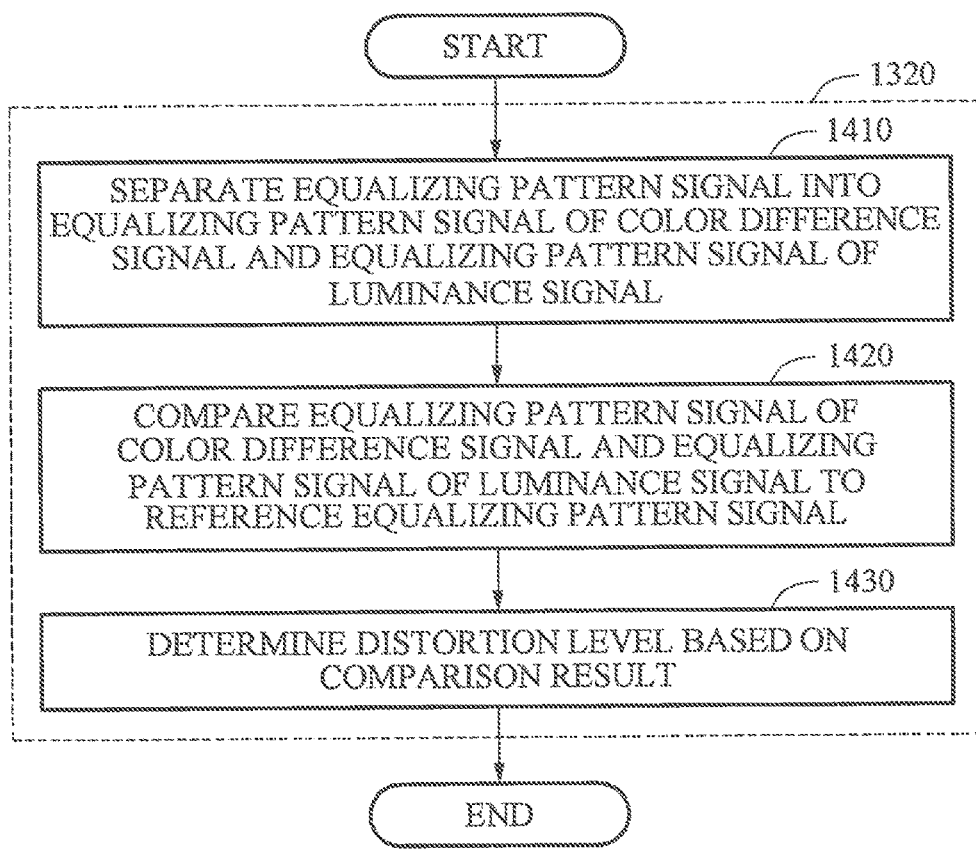
FIG. 14 is a flowchart illustrating an example of a method of determining a distortion level of an analog video signal according to example embodiments.

FIG 14 is a flowchart illustrating an example of a method of determining a distortion level of an analog video signal according to example embodiments.

Operation 1320 of FIG. 13 may include operations 1410 through 1430.

In operation 1410, the processor 1120 may separate the detected equalizing pattern signal into an equalizing pattern signal of a color difference signal and an equalizing pattern signal of a luminance signal.

For example, the processor 1120 may separate the equalizing pattern signal into the equalizing pattern signal of the color difference signal and the equalizing pattern signal of the luminance signal using a comb filter. The comb filter may adaptively change a burst frequency based on a resolution of the analog video signal.

According to an aspect, the processor 1120 may remove noise from the equalizing pattern signal of the color difference signal and the equalizing pattern signal of the luminance signal using a low pass filter (LPF). A pass frequency of an LPF to be applied to the equalizing pattern signal of the luminance signal and a pass frequency of an LPF to be applied to the equalizing pattern signal of the color difference signal may differ.

In operation 1420, the processor 1120 may compare at least one of the equalizing pattern signal of the color difference signal and the equalizing pattern signal of the luminance signal to a reference equalizing pattern signal.

The reference equalizing pattern signal may be the equalizing pattern signal 910 of the luminance signal and the equalizing pattern signal 930 of the color difference signal that are determined through negotiation.

In operation 1430, the processor 1120 may determine a distortion level based on at least one of the equalizing pattern signal of the color difference signal and the equalizing pattern signal of the luminance signal.

According to an aspect, the distortion level may correspond to a slope of the equalizing pattern signal of the luminance signal. For example, the distortion level may be mapped to correspond to a section of slope values. For example, a section of 85 to 90 degrees may correspond to a first distortion level, and a section of 80 to 85 degrees may correspond to a second distortion level.

According to another aspect, the distortion level may correspond to an amplitude value of the equalizing pattern signal of the color difference signal. For example, the distortion level may be mapped to correspond to a section of amplitude values.

According to another aspect, the processor 1120 may determine one of a distortion level of a DC area and a distortion level of an AC area based on the equalizing pattern signal of the luminance signal. The processor 1120 may determine a final distortion level based on a determined plurality of distortion levels.

The distortion level of the DC area and the distortion level of the AC area will be described with reference to FIG. 15.

Figure 15:
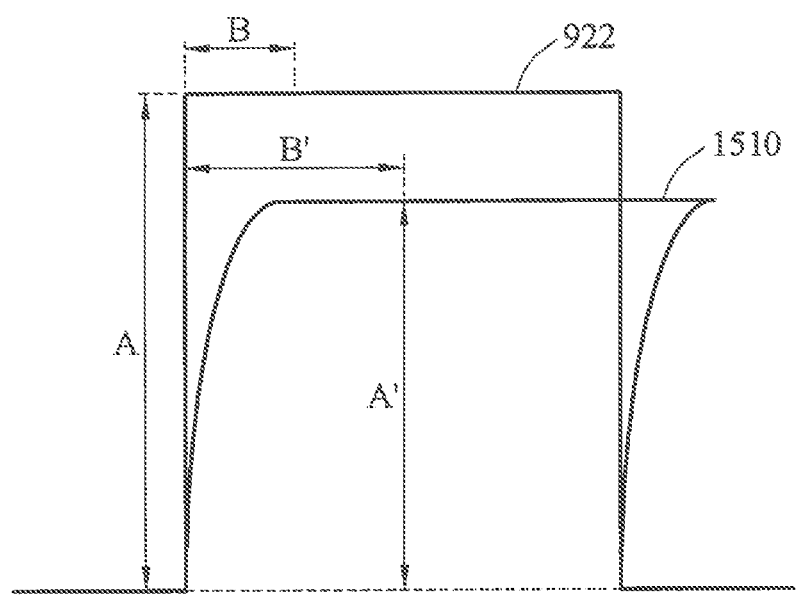
FIG. 15 illustrates an example of a detected equaling pattern signal of a luminance signal and a reference equalizing pattern signal according to example embodiments.

FIG. 15 illustrates an example of a detected equalizing pattern signal of a luminance signal and a reference equalizing pattern signal according to example embodiments.

The reference equalizing pattern signal may be the second signal 922 of FIG. 9, The processor 1120 may compare a detected equalizing pattern signal 1510 of a luminance signal and the reference equalizing pattern signal.

According to an aspect, the processor 1120 may compare an amplitude A of the equalizing pattern signal 1510 of the luminance signal and an amplitude A' of the second signal 922 corresponding to the reference equalizing pattern signal in order to determine a distortion level of a DC area.

According to another aspect, the processor 1120 may compare a width B of the equalizing pattern signal 1510 of the luminance signal and a width B' of the second signal 922 corresponding to the reference equalizing pattern signal in order to determine a distortion level of an AC area.

The units and/or modules described herein may be implemented using hardware components, software components, and/or combination of the hardware components and the software components. For example, the apparatuses and the hardware components described herein may be implemented using, for example, a processor, a controller and an arithmetic logic unit (ALU), a digital signal processor, a microcomputer, a field programmable array (FPA), as programmable logic unit (PLU), a microprocessor, or one or more general-purpose computers or specific-purpose computers such as any other device capable of responding to and executing instructions in a defined manner. The processing device may run an operating system (OS) and one or more software applications that run on the OS. The processing device also may access store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such a parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical media and floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A protocol transmission method performed by a protocol transmission apparatus within a closed-circuit system, the protocol transmission method comprising:
    indicating a first protocol signal on a first area preset within a vertical blanking interval (YBI) of an analog video signal;
    indicating an equalizing pattern signal on a second area preset within the VBI, wherein the equalizing pattern signal is used for compensating of the analog video signal by a protocol reception apparatus; and
    transmitting the analog video signal to the protocol reception apparatus of the closed-circuit system,
    wherein the first area differs from a third area preset within the VBI of the analog video signal with respect to the protocol reception apparatus, and
    wherein a second protocol signal is able to be indicated on the third area by the protocol reception apparatus.

2. The protocol transmission method of claim 1, wherein the transmitting comprises transmitting the analog video signal to the protocol reception apparatus through a coaxial cable.

3. The protocol transmission method of claim 1, wherein the first protocol signal indicates at least one of a format of the analog video signal, an intensity of illumination of a video indicated by the analog video signal, information about a sensor used to photograph the video, and motion information of the sensor.

4. The protocol transmission method of claim 1, wherein the first protocol signal is a signal for controlling an operation of a video photographing device of the protocol reception apparatus.

5. The protocol transmission method of claim 1, wherein the indicating comprises indicating a plurality of the same first protocol signals on the first area.

6. The protocol transmission method of claim 1, wherein the equalizing pattern signal is a composite signal that includes an equalizing pattern signal of a color difference signal and an equalizing pattern signal of a luminance signal.

7. The protocol transmission method of claim 6, wherein the equalizing pattern signal of the luminance signal and the equalizing pattern signal of the color difference signal are negotiated in advance with the protocol reception apparatus.

8. A protocol transmission apparatus within a closed-circuit system, the protocol transmission apparatus comprising:
    a processor configured to indicate a first protocol signal on a first area preset within a vertical blanking interval (VBI) of an analog video signal and to indicate an equalizing pattern signal on a second area preset within the VBI, wherein the equalizing pattern signal is used for compensating of the analog video signal by a protocol reception apparatus; and
    a communicator configured to transmit the analog video signal to the protocol reception apparatus of the closed-circuit system,
    wherein the first area differs from a third area preset within the VBI of the analog video signal with respect to the protocol reception apparatus, and
    wherein a second protocol signal is able to be indicated on the third area by the protocol reception apparatus.

9. A protocol reception method performed by a protocol reception apparatus within a closed-circuit system, the protocol reception method comprising:
    receiving an analog video signal from a protocol transmission apparatus of the closed-circuit system;
    compensating for the analog video signal based on an equalizing pattern signal indicated on a second area preset within the VBI; and
    detecting a first protocol signal on a first area preset within a vertical blanking interval (VBI) of the analog video signal, the detecting is performed based on the compensated analog video signal,
    wherein the first area differs from a third area preset within the VBI of the analog video signal with respect to the protocol reception apparatus, and
    wherein a second protocol signal is able to be indicated on the third area by the protocol reception apparatus.

10. The protocol reception method of claim 9, wherein the receiving comprises receiving the analog video signal from the protocol transmission apparatus through a coaxial cable.

11. The protocol reception method of claim 9, wherein the first protocol signal indicates at least one of a format of the analog video signal, an intensity of illumination of a video indicated by the analog video signal, information about a sensor used to photograph the video, and motion information of the sensor.

12. The protocol reception method of claim 9, wherein the first protocol signal is a signal for controlling an operation of a video photographing device of the protocol reception apparatus.

13. The protocol reception method of claim 9, wherein the detecting comprises detecting a plurality of the same first protocol signals indicated on the first area.

14. The protocol reception method of claim 9, wherein the equalizing pattern signal is a composite signal that includes an equalizing pattern signal of a color difference signal and an equalizing pattern signal of a luminance signal.

15. The protocol reception method of claim 9, wherein the compensating comprises:
    detecting the equalizing pattern signal;
    determining a distortion level of the analog video signal based on the equalizing pattern signal; and
    compensating for the analog video signal by applying a filter corresponding to the distortion level to the analog video signal.

16. The protocol reception method of claim 15, wherein the determining of the distortion level comprises:

separating the equalizing pattern signal into an equalizing pattern signal of a color difference signal and an equalizing pattern signal of a luminance signal; and determining the distortion level based on at least one of the equalizing pattern signal of the luminance signal and the equalizing pattern signal of the color difference signal.

17. The protocol reception method of claim 15, wherein the determining of the distortion level comprises:

comparing a reference equalizing pattern signal to at least one of an equalizing pattern signal of a color difference signal and an equalizing pattern signal of a luminance signal; and determining the distortion level based on a result of the comparing.

18. The protocol reception method of claim 16, wherein the determining of the distortion level based on at least one of the equalizing pattern signal of the luminance signal and the equalizing pattern signal of the color difference signal comprises determining at least one of a distortion level of a direct current (DC) area and a distortion level of an alternating current (AC) area based on the equalizing pattern signal of the luminance signal.

* * * * *